United States Patent [19]
Rodriguez et al.

[11] Patent Number: 5,497,552
[45] Date of Patent: Mar. 12, 1996

[54] GREEN BANANA/PLANTAIN PEELER

[76] Inventors: Edwin Rodriguez, 1405 Park Ave. #8E, New York, N.Y. 10029; George Spector, deceased, late of 233 Broadway Rm 702, New York, N.Y. 10279

[21] Appl. No.: 374,342
[22] Filed: Jan. 17, 1995
[51] Int. Cl.⁶ ..................................................... A47J 17/02
[52] U.S. Cl. ........................................ 30/123.5; 30/113.1
[58] Field of Search ............................... 30/123.5, 123.7, 30/123.6, 314, 315, 326, 113.1; 99/584, 588, 567; D7/693

[56] References Cited

U.S. PATENT DOCUMENTS 2,692,428  10/1954  Morishita ............................... 30/123.5
3,571,925   3/1971  Deutschmann .......................... 30/314
4,010,541   3/1977  Papineau ............................. 30/123.7
4,970,786  11/1990  Harper ............................... 30/123.7

Primary Examiner—Hwei-Siu Payer

[57] ABSTRACT

A device for peeling a green banana and plantain comprising a handle to be grasped by a first hand of a person. A curved peeling tip extends outwardly from an end of the handle to fit under a skin of the green banana and plantain, in which both ends are cut off and the skin has a plurality of lengthwise slits. A curved shield extends at a rearward angle up from a top surface of the curved peeling, so as to protect a nail of a thumb of the first hand grasping the handle when pushing forward to peel the skin off of the green banana and plantain held in a second hand of the person.

2 Claims, 1 Drawing Sheet

GREEN BANANA/PLANTAIN PEELER

BACKGROUND OF THE INVENTION

The instant invention relates generally to peeling and shelling devices and more specifically it relates to a green banana and plantain peeler, which provides a hand held tool which removes the skin from the fruit.

There are available various conventional peeling and shelling devices which do not provide the novel improvements of the invention herein disclosed.

SUMMARY OF THE INVENTION

A primary object of the present invention is to provide a green banana and plantain peeler that will overcome the shortcomings of the prior art devices.

Another object is to provide a green banana and plantain peeler that is a hand held tool used to remove the skin from the fruit in an evenly, smoother and cleaner manner.

An additional object is to provide a green banana and plantain peeler that can be used in conjunction with a holder to engage the green banana or plantain, so as to keep a grasping hand clean and the fruit from becoming soiled from the grasping hand.

A further object is to provide a green banana and plantain peeler that is simple and easy to use.

A still further object is to provide a green banana and plantain peeler that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
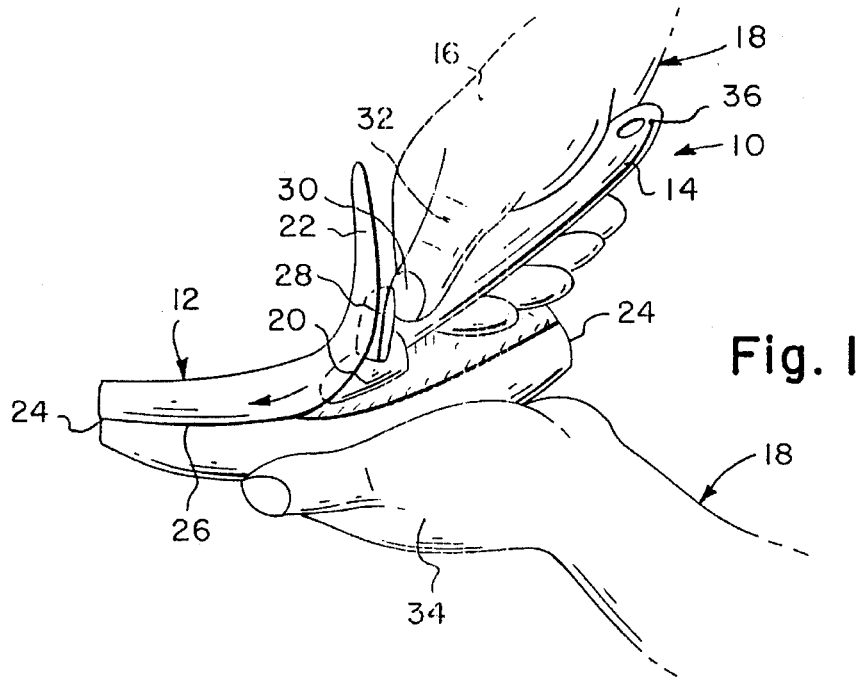
FIG. 1 is a perspective view showing the instant invention peeling a green banana or plantain.
Figure 2:
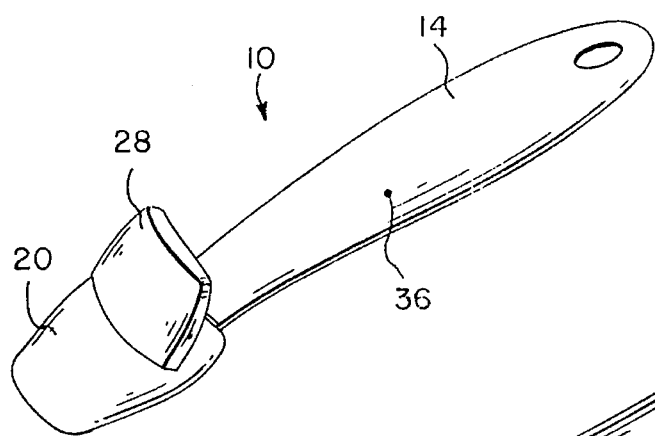
FIG. 2 is a perspective view of the instant invention per se.

Turning now descriptively to the drawings, in which similar reference characters denote similar elements throughout the several views, FIGS. 1 and 2 illustrate a device 10 for peeling a green banana and plantain 12, comprising a handle 14 to be grasped by a first hand 16 of a person 18. A curved peeling tip 20 extends outwardly from an end of the handle 14 to fit under a skin 22 of the green banana and plantain 12, in which both ends 24 are cut off and the skin has a plurality of lengthwise silts 26. A curved shield 28 extends at a rearward angle up from a top surface of the curved peeling tip 20, so as to protect a nail 30 of a thumb 32 of the first hand 16 grasping the handle 14 when pushing forward to peel the skin 22 off of the green banana and plantain 12 held in a second hand 34 of the person 18. The curved peeling tip 20, the curved shield 28 and the handle 14 are integral and fabricated out of a durable plastic material 36.

Figure 3:
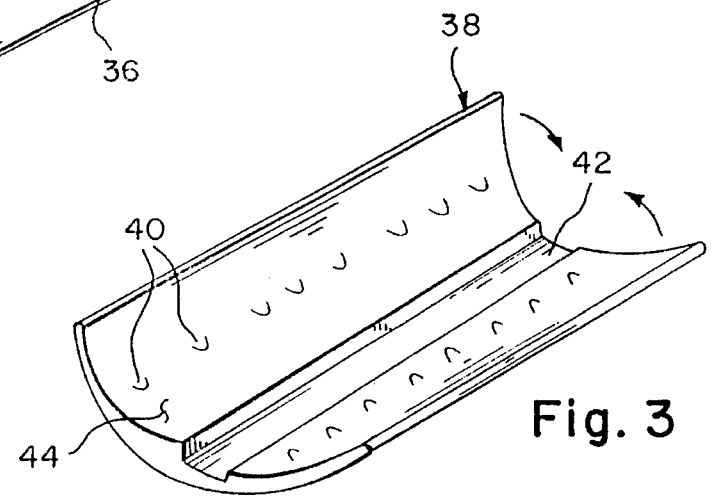
FIG. 3 is a perspective view of a holder that can be used for engaging the green banana or plantain when using the tool, so as to keep the hand clean.

A curved holder 38, as shown in FIG. 3, has a plurality of prongs 40 and a flexible center slot 42 on an inner surface 44. The prongs 40 in the curved holder 38 can engage the green banana and plantain 12 when placed and gently squeezed in the second hand 34 of the person 18, so as to keep the second hand 34 clean. The flexible center slot 42 allows the handle 14 to be stored therein when not in use.

Figure 4:
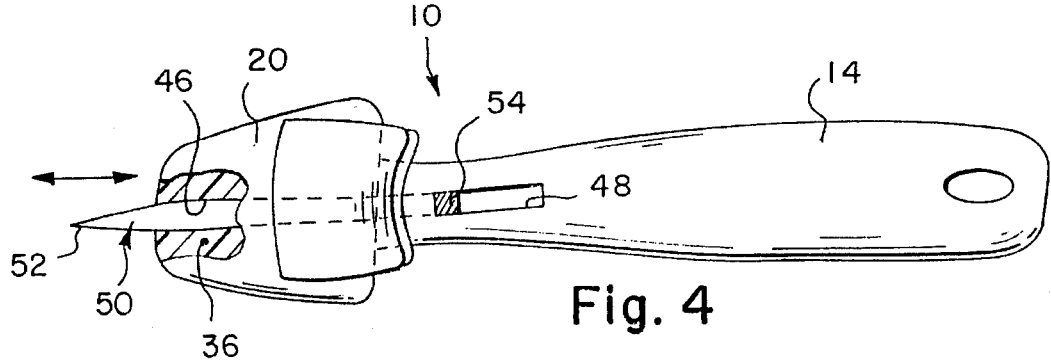
FIG. 4 is a top view of a modified tool containing a retractable knife blade built therein for cutting and slitting the green banana or plantain before peeling.

In FIG. 4, the curved peeling tip 20 has a track 46 longitudinally formed therein from its front end into a portion of the handle 14 adjacent said curved peeling tip 20. The handle 14 has a slot 48 on a top surface extending down into the track 46. A knife blade 50 is provided and has a front cutting end 52. The knife blade 50 slides in the track 46. An actuator button 54 is affixed perpendicular on a back end of the knife blade 50 and extends upwardly through the slot 48. The thumb 32 of the first hand 16 of the person 18 can manually operate the actuator button 54, to extend and retract the front cutting end 52 of the knife blade 50 in the track 46. The front cutting end 52 is to be used to cut off both ends 24 and make the lengthwise slits 26 in the skin 22 of the green banana and plantain 12 before peeling.

OPERATION OF THE INVENTION

To use the device 10, the person 18 cuts off the ends 24 and makes the lengthwise slits 26 in the skin 22 with a knife or with the cutting end 52 of the knife blade 50 in the device 10. The green banana and plantain 12 is then placed in the second hand 34 or in the holder 38. The curved peeling tip 20 is inserted under the skin 22 and pushed forward by the first hand 16 grasping the handle 14. The skin 22 is then peeled off.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A device for peeling a green banana and plantain comprising:

a) a handle to be grasped by a first hand of a person;

b) a curved peeling tip extending outwardly from an end of said handle to fit under a skin of the green banana and plantain, in which both ends of the green banana and plantain are cut off and the skin having a plurality of lengthwise slits;

c) a curved shield extending at a rearward angle up from a top surface of said curved peeling tip, so as to protect a nail of a thumb of the first hand grasping said handle when pushing forward to peel the skin off of the green banana and plantain held in a second hand of the person; further including a curved holder having a plurality of prongs and a flexible center slot on an inner surface, whereby said prongs in said curved holder can engage the green banana and plantain when placed and gently squeezed in the second hand of the person, so as to keep the second hand clean while said flexible center slot allows said handle to be stored therein when not in use.

2. A device as recited in claim 1, further including:

a) said curved peeling tip having a track longitudinally formed therein from its front end into a portion of said handle adjacent said curved peeling tip;

b) said handle having a slot on a top surface extending down into said track;
c) a knife blade having a front cutting end, in which said knife blade slides in said track and
d) an actuator button affixed perpendicular on a back end of said knife blade and extending upwardly through said slot, so that the thumb of the first hand of the person can manually operate said actuator button to extend and retract said front cutting end of said knife blade in said track, in which said front cutting end is to be used to cut off both ends of the green banana and plantain and make the lengthwise slits in the skin of the green banana and plantain before peeling.

* * * * *